United States Patent [19]

Tsuda

[11] Patent Number: 4,502,887
[45] Date of Patent: Mar. 5, 1985

[54] UNDERWATER CONCRETING CEMENT COMPOSITION

[75] Inventor: Kenji Tsuda, Himeji, Japan

[73] Assignee: Daicel Chemical Industries, Ltd., Sakai, Japan

[21] Appl. No.: 567,025

[22] Filed: Dec. 30, 1983

[30] Foreign Application Priority Data

Jan. 19, 1983 [JP] Japan .................. 58-6895

[51] Int. Cl.$^3$ .............................. C04B 7/353
[52] U.S. Cl. ...................... 106/93; 106/315
[58] Field of Search ................... 106/93, 315

[56] References Cited

U.S. PATENT DOCUMENTS 4,191,584  3/1980  Berry ..................... 106/315
4,240,840  12/1980  Downing et al. ........... 106/93

*Primary Examiner*—James Poer
*Attorney, Agent, or Firm*—Flynn, Thiel, Boutell & Tanis

[57] ABSTRACT

An underwater concreting cement composition comprising a base prepared by adding (a) 0.2 to 2.0 parts by weight of hydroxyethylcellulose and (b) 0.01 to 0.2 part by weight of high-molecular weight polyethylene oxide and/or 0.2 to 4.0 parts by weight of calcium formate. The hydroxyethylcellulose preferably has the molar number of ethylene oxide substituted per glucose unit of 1.5 to 4.0 and a viscosity at 25° C. in a 1% aqueous solution of 1,000 to 7,000 cP. The high-molecular weight polyethylene oxide preferably has an average molecular weight of 60,000 to 6,000,000. Calcium formate is added to accelerate the setting.

This underwater concreting cement composition can be directly placed under water or in a watery place. Moreover, this composition is free from bleeding and can be pumped.

6 Claims, No Drawings

UNDERWATER CONCRETING CEMENT COMPOSITION

BACKGROUND OF THE INVENTION

This invention relates to a cement composition which can be directly placed under water and to such a composition which can be pumped.

This invention relates to an improvement in a cement composition which can be directly placed under water or in a watery place. Particularly, this invention relates to an underwater concreting cement composition having improved flow during placing and an improved hardening rate. Moreover, this invention provides an underwater concreting cement composition which does not corrode reinforcements or steel frames.

Up to this time, when ready mixed concrete was directly placed under water without using any tremie or enclosure, the cement was washed out during the placing by the surrounding water and was dispersed in the water, or it was dispersed or washed out after the placing by a water stream or waves before it hardened. A deformation of the concrete or a partial loss of the cement portion from the concrete occurred whereby to effect unsatisfactory hardening, so that it was only possible to obtain concrete having markedly lowered strength after hardening.

In recent years, a concrete has been proposed which can be directly placed in a desired place by shooting it through water by using an additive which imparts viscosity to cement.

For example, the specification of West German Patent Publication No. 2,326,647 describes that the dispersion of cement into water can be prevented by adding thereto a cellulose ether, polyacrylamide or the like and discloses a formulation containing hydroxyethylcellulose as an example. Further, Japanese Patent Laid-Open No. 3921/1982 relates to a process for placing an underwater concrete and shows a concrete formulation containing polyacrylamide as an example.

On the other hand, in many of the sites in Japan where underwater concreting must be applied, it is generally difficult to provide a working shop and a staging which are convenient for preparing a concrete composition and for shooting it directly to the area in which it is to be placed and, therefore, it is an essential requirement to use ready mixed concrete that can be pumped.

An important factor for preventing the dispersion of cement into water is to increase the viscosity of the cement composition, and this purpose can be attained by the addition of a water-soluble polymer.

When polyacrylamide is added to cement as in the specification of Japanese Patent Laid-Open No. 3921/1982, the dispersion of the cement into water can be reduced effectively but the flow of the cement is markedly worsened so that it is difficult to obtain a pumpable composition.

A number of cellulose ethers constitute examples of the polymer additives which are known as cement additives. Namely, the addition of a cellulose ether is effective in increasing the viscosity as well as flow, so that it is used to improve the application workability of mortar (see, for example, Japanese Patent Laid-Open Nos. 130823/1975 and 22666/1981). Further, a variety of cellulose ethers, such as ethylcellulose, methylcellulose, hydroxyethylcellulose, hydroxypropylcellulose, methylhydroxyethylcellulose, or methylhydroxypropylcellulose can be added to cement. However, when these cellulose ethers are used as cement additives, an air-entraining property is imparted to the cement and, therefore, when a sufficient quantity of the ethers is added to prevent dispersion of the cement into water, the quantity of air entrained by the mortar or concrete becomes too high, resulting in lowering of the strength of a structure after hardening. In order to lower the quantity of air entrained by this cement/cellulose ether composition, the addition of a defoamer is effective, but the flow of the composition is lowered as well, because the flow of the cement/cellulose ether composition is also dependent upon the quantity of air. It has therefore been thought to be very difficult to obtain a mortar or concrete composition which is resistant to dispersion into water, has good flow properties and a low entrained air quantity.

Further, West German Patent Publication No. 2,326,647 describes the addition of both a polymer additive and a cement setting accelerator to an underwater concreting cement composition and discloses calcium chloride, sodium aluminate or alumina cement as the accelerator. However, calcium chloride, though inexpensive, has a drawback that it dissolves in water to form chloride ions which corrode iron and so raises a great practical restriction in that it can not be used in structures under water or in watery places, such as reinforced concrete or concrete in contact with iron. Moreover, the use of the polymer additive together with sodium aluminate or alumina cement, which is an accelerator noncorrosive to iron, has a drawback that the flow of an underwater concreting cement composition is markedly lowered. It has, therefore, been thought to be very difficult to obtain an underwater concreting cement composition which does not cause the dispersion of cement into water, has good flow, does not corrode iron and has a suitable setting time.

As a result of an intense study, the inventors of this invention have recognized that a composition having a good flow, a good resistance to dispersion into water and a low air-entraining property, that is, a composition suited as underwater concreting cement, can be obtained by adding cellulose ethers, especially hydroxyethylcellulose, together with a high-molecular weight polyethylene oxide to cement and thereby have reached this invention. Further the inventors have found that, surprisingly, the flow of a cement composition can be improved and at the same time the setting time can be shortened by combining hydroxyethylcellulose, which is the polymer additive, with calcium formate which is a cement setting accelerator noncorrosive to iron, and have accomplished this invention.

SUMMARY OF THE INVENTION

An object of this invention is to provide a cement composition prepared by adding 0.2 to 2.0 parts by weight of hydroxyethylcellulose and 0.01 to 0.2 part by weight of polyethylene oxide to 100 parts by weight of cement.

Another object of the invention is to provide an underwater concreting cement composition comprising a base prepared by adding 0.2 to 2.0 parts by weight of hydroxyethylcellulose and 0.2 to 4.0 parts by weight of calcium formate to 100 parts by weight of cement.

DETAILED DESCRIPTION OF THE PREFERRED EMBODIMENTS

The hydroxyethylcellulose used in this invention preferably has a relatively large molar number of substitution and a high molecular weight. When a hydroxyethylcellulose which can satisfy the above requirements are selected from those which can be manufactured industrially and are available at a suitable cost, one in which the molar number of ethylene oxide substituted is 1.5 to 4.0 per anhydroglucose unit, and its viscosity at 25° C. in a 1% solution is 1,000 to 7,000 cP is suitable. When the viscosity is low, the effect of preventing dispersion becomes small, whereas when the viscosity is too high, the flow is rather worsened.

When the amount of hydroxyethylcellulose added to cement is too small, neither the effect of preventing dispersion into water nor that of improving the flow due to air entrainment can be obtained. On the contrary, when this amount is too large, the viscosity becomes so high that the flow is worsened and the hardening of cement is retarded markedly. Therefore, the suitable amount is in the range of 0.2 to 2.0 parts by weight per 100 parts by weight of cement.

The high-molecular weight polyethylene oxide used in this invention is suitably one that has a molecular weight which is not too high and those having an average molecular weight of 60,000 to 6,000,000, preferably 100,000 to 2,500,000, may be employed. Those having a molecular weight of below 100,000 or above 2,500,000 tend toward showing an unsatisfactory effect of lowering the air quantity or improving the flow.

The amount of the polyethylene oxide added is suitably about 1/10 time that of the hydroxyethylcellulose, and when this amount is too small or too large, it is difficult to maintain the air quantity within the desirable range, and therefore the suitable range is 0.01 to 0.2 part by weight per 100 parts by weight of cement.

On the other hand, when the amount of calcium formate which is added as an accelerator is too small, no desirable effect of accelerating the setting can be obtained, whereas when this amount is too large, the setting time is shortened excessively, resulting in worsened workability. Therefore, the desirable amount of calcium formate added is in the range of 0.2 to 4.0 parts of weight per 100 parts by weight of cement.

It is also possible in the composition of this invention that polyethylene oxide which is the second component is used together with calcium formate in the amounts specified above.

This invention provides an underwater concreting cement composition which is effective in preventing the dispersion of cement into water, having a suitable setting rate, being noncorrosive to iron and being particularly excellent in the flow during application, by combining hydroxyethylcellulose having a thickening effect on cement with calcium formate having a setting accelerating effect on cement.

A remarkable effect obtained by this combination is a unique one for improving especially the flow during application, that is, applicability. When other water-soluble formates having a similar accelerating effect, such as magnesium formate, sodium formate or potassium formate, are added, the flow is lowered instead. Furthermore, the flow is lowered also when calcium formate is added to methylhydroxyethylcellulose, as the polymer additive, which has a structure similar to that of hydroxyethylcellulose, and this fact proves that the effect of this invention is remarkable and unforeseeable.

As has been described in order to illustrate the technique, there are a number of cellulose ethers which, when added to cement, can impart thereto viscosity and flow, and all of them can show effects which are substantially similar with only a little difference. However, it is only hydroxyethylcellulose that can give a cement composition having markedly low air entrainment when used in combination with polyethylene oxide. Even an ether mixture having similar molecular structures, such as hydroxypropylcellulose or hydroxyethylcellulose/alkylcellulose or hydroxyethylcellulose/alkylcellulose can not show such an excellent effect as in the hydroxyethylcellulose/polyethylene oxide system.

The present invention will now be described by way of its examples.

Brief description is made of the items of measurement and cement properties. "Turbidity of water" is a degree of turbidness of water observed when mortar is allowed to fall freely through water, and a smaller value indicates a lower dispersion. "Air quantity" is the quantity of air contained in mortar before hardening. "Penetration depth" is a measure of flow and a penetration of a higher value represents a higher flow.

In addition, no occurrence of a phenomenon such as "bleeding" or "flotation of water" must be observed.

Generally, water, sand and cement are kept dispersed uniformly in the composition just after the preparation of mortar, but upon standing, the water is sometimes separated in the upper layer owing to a difference in specific gravities between the solid material and water. This is called bleeding and occurs 30 to 60 minutes after the preparation of mortar, and about 1/10 of the water used is separated. It is necessary for the cement to be pumped up that the composition be freed from this bleeding phenomenon and at the same time has a high flow. In the examples, bleeding was observed only in the blank test mortar of Experiment No. 1, but not in any of the mortars containing a polymer additive and, therefore, this item was not explicitly presented in the results of the examples. Thus, the judgement of the pumpability was based only on the penetration depth.

EXAMPLE 1

The standard preparative method of mortar used in the examples was as follows.

Water was added to portaland cement to form a paste of a water/cement ratio of B 0.65/1, which was then mixed with a polymer additive used in an amount of 0.45 wt.%, based on the cement, to form polymer-containing cement. This cement was mixed with Toyoura standard sand to form a 1:2 mortar.

This mortar was measured for a variety of properties according to the following methods.

a. Turbidity of water a-1) A 1:2 mortar is used as a sample. Mixing is performed according to the mechanical mixing method stipulated in JIS R-5201 "Physical Testing Methods of Cement".

a-2) 1 l of water is placed in a 1 l measuring cylinder and about 150 g of mortar in the form of a dough ball is allowed to fall freely at once from the surface of the water.

a-3) When five seconds have elapsed after the fall, about 10 ml of turbid water is taken with a pipette from the point near the 400 ml scale of the measuring cylinder.

a-4) After thorough mixing, the turbid water taken is measured rapidly for the turbidity by means of a colorimeter (Hunter colorimeter D 25 D 2). This turbidity is converted into a corresponding solid concentration (ppm) by using a calibration curve showing the relationship between a turbidity and a solid concentration and prepared by using kaolin.

a-5) A mortar of a turbidity of 10 ppm or below shall be deemed as acceptable.

b. Air quantity b-1) Mortar is prepared in the same way as in a(1).

b-2) Air quantity is determined according to the Testing Method of Air Quantity as stipulated in the Standard for Judging Quality of Plasterer's Mortar Admixtures (proposal) by the Japan Housing Corporation.

b-3) A mortar of an air quantity of 10% or below shall be deemed as acceptable.

c. Penetration depth c-1) Mortar is prepared in the same way as in a(1).

c-2) A penetration depth of a 1.5 kg plunger into the mortar is measured according to the testing method "Workability" as stipulated in the Standard for Judging Quality of Plasterer's Mortar Admixture (proposal) by the Japan Housing Corporation.

c-3) A mortar of a penetration depth of at least 75 mm shall be deemed as acceptable.

Table 1 shows the additives used and the results of the measurement of mortar properties. In Table 1, HEC refers to hydroxyethylcellulose, HPMC hydroxypropylmethylcellulose, MHEC methylhydroxyethylcellulose, PAA polyacrylamide, and PEO polyethylene oxide.

It was found that a mortar containing hydroxyethylcellulose and polyethylene oxide as the polymer additives but not containing any defoamer had well-balanced good mortar properties and was suitable as an underwater concrete.

EXAMPLE 2

A paste of a water/cement ratio of 0.65/1 was prepared in the same way as in Example 1 and a polymer-containing cement was prepared therefrom by using hyroxyethylcellulose (HEC Unicell SP 900) and polyethylene oxide (PEO-3) as the polymer additive. Toyoura standard sand was added to this cement to form a 1:2 mortar. The properties were measured in the same way as in Example 1. Table 2 shows the mortar compositions and the results of the measurement.

It was found that a mortar having a combination in amounts of specified ranges of hydroxyethylcellulose and polyethylene oxide satisfied the requirements for water turbidity, air quantity and penetration depth and was suitable as an underwater concrete composition.

TABLE 1

Mortar properties (water/cement = 0.65/1, sand/cement = 2/1)

| | Additives | | | Mortar properties | | | |
|---|---|---|---|---|---|---|---|
| No. | Substance | Grade Manufacturer | Amount % based on cement | Turbidity of water ppm | Air quantity % | Penetration depth mm | Total evaluation |
| 1 | — | — | | >1000 | 1.2 | 85 | |
| 2 | HEC | HEC Unicell SP 900*[1] Daicel Kagaku Kogyo | 0.45 | 9 | 28.7 | >100 | |
| 3 | HMPC | Metolose 90SH-30000 Shinetsu Kagaku Kogyo | 0.45 | 41 | 19.5 | >100 | |
| 4 | MHEC | Tylose MHB-30000 Hoechst | 0.45 | 55 | 17.5 | >100 | |
| 5 | PEO | PEO-3*[2] Seitetsu Kagaku | 0.45 | >200 | 5.1 | 83 | |
| 6 | PAA | Aronflock N-110S Nippon Gosei Kagaku | 0.45 | 20 | 2.1 | 15 | |
| 7 | HEC Defoamer | HEC Unicell SP 900 Disfoam CC-118 (Nippon Yushi) | 0.45 0.04 | 13 | 5.4 | 58 | |
| 8 | HEC Defoamer | HEC Unicell SP 900 SN Defoamer 24-FP (San Nopco) | 0.45 0.04 | 11 | 7.2 | 58 | |
| 9 | HEC Defoamer | HEC Unicell SP 900 SN Defoamer 14-HP (San Nopco) | 0.45 0.04 | 12 | 3.5 | 60 | |
| 10 | HEC Defoamer | HEC Unicell SP 900 1H Silicone SH-200 (Toray Silicone) | 0.45 0.04 | 13 | 28.5 | >100 | |
| 11 | HEC PEO | HEC Unicell SP 900 PEO-3 (Seitetsu Kagaku) | 0.45 0.02 | 6 | 5.7 | 78 | o |
| 12 | HPMC PEO | Metolose 90SH-30000 PEO-3 (Seitetsu Kagaku) | 0.45 0.02 | 22 | 18.0 | >100 | |
| 13 | MHEC PEO | Tylose MHB-30000 PEO-3 (Seitetsu Kagaku) | 0.45 0.02 | 20 | 17.2 | >100 | |

*[1] glyoxal-crosslinked type
*[2] M.W. 0.6~1.1 × $10^6$ (value in the catalogue)

TABLE 2

Mortar properties

| | Additives | | Amount % based on cement | Turbidity of water (ppm) | Air quantity (%) | Penetration depth (mm) | Total evaluation |
|---|---|---|---|---|---|---|---|
| No. | | | | | | | |
| (2) | HEC | 100% | 0.45 | 6 | 28.7 | >100 | |
| 14 | HEC | 95% | 0.45 | 6 | 5.7 | 78 | o |

TABLE 2-continued

| | Additives | | Mortar properties | | | |
|---|---|---|---|---|---|---|
| No. | | Amount % based on cement | Turbidity of water (ppm) | Air quantity (%) | Penetration depth (mm) | Total evaluation |
| 15 | PEO 5% HEC 90% | 0.45 | 17 | 5.9 | 82 | |
| 16 | PEO 10% HEC 80% | 0.45 | 34 | 7.7 | 82 | |
| 17 | PEO 20% HEC 50% PEO 50% | 0.45 | >200 | 7.2 | 83 | |
| 18 | HEC PEO | 0.45 0.04 | 5 | 6.4 | 78 | o |
| 19 | HEC PEO | 0.45 0.10 | 4 | 7.7 | 77 | o |
| 20 | HEC PEO | 0.45 0.4 | 3 | 12.2 | 75 | |
| 21 | HEC 95% PEO 5% | 0.35 | 48 | 3.5 | 78 | |
| 22 | HEC 95% PEO 5% | 0.40 | 18 | 4.3 | 83 | |
| 23 | HEC 95% PEO 5% | 0.50 | 6 | 5.7 | 80 | o |
| 24 | HEC 95% PEO 5% | 0.60 | 3 | 5.9 | 78 | o |
| (7) | PEO 100% | 0.45 | >200 | 5.1 | 83 | |

EXAMPLE 3 AND COMPARATIVE EXAMPLES 1 TO 3

The standard preparative method of mortar used in this example was as follows.

Water was added to portland cement to form a paste of a water/cement ratio of 0.65/1, which was then mixed with 0.45 wt.%, based on the cement, of a polymer additive and an accelerator to form a cement containing the polymer and the accelerator. Toyoura standard sand was added to this polymer-containing cement to form a 1:2 mortar.

Various properties were measured on this mortar as well as one containing no accelerator as a comparative and ones containing well-known accelerators other than calcium formate. The measurements were carried out in the same way as in Example 1.

Table 3 shows the additives used and the test results of mortar properties. The results of Table 3 show that concerning mortars containing hydroxyethylcellulose, calcium formate provided a better flow (penetration depth) than sodium silicate (water glass) or sodium aluminate which was a convential accelerator noncorrosive to reinforcements.

TABLE 3

Additives and Mortar properties (water/cement = 0.65/1, sand/cement = 2/1)

| | | Additives | | Mortar properties | | | |
|---|---|---|---|---|---|---|---|
| No. | Substances | Manufacturer and Grade | Amount (% based on cement) | Turbidity of water (ppm) | Air quantity (%) | Penetration depth (mm) | Total evaluation[3] |
| Comparative Example 1 | HEC[1] PEO[2] | Daicel Kagaku Kogyo SP 900 Seitetsu Kagaku PEO-3 | 0.45 0.04 | 5 | 6.4 | 78 | |
| Example 3 | HEC PEO Accelerator | Daicel Kagaku Kogyo SP 900 Seitetsu Kagaku PEO-3 Reagent grade calcium formate | 0.45 0.04 2.00 | 5 | 6.3 | 91 | |
| Comparative Example 2 | HEC PEO Accelerator | Daicel Kagaku Kogyo SP 900 Seitetsu Kagaku PEO-3 Yushi Kakosha Manol accelerator (65% sodium silicate) | 0.45 0.04 2.00[3] | 6 | 6.4 | 70 | Δ |
| Comparative Example 3 | HEC PEO | Daicel Kagaku Kogyo SP 900 Seitetsu Kagaku PEO-3 | 0.45 0.04 | 6 | 6.5 | 10 | x |

TABLE 3-continued

Additives and Mortar properties (water/cement = 0.65/1, sand/cement = 2/1)

| No. | Additives Substances | Manufacturer and Grade | Amount (% based on cement) | Turbidity of water (ppm) | Air quantity (%) | Penetration depth (mm) | Total evaluation[4] |
|---|---|---|---|---|---|---|---|
| | Accelerator | Reagent grade sodium aluminate | 2.00 | | | | |

Notes:
[1] HEC: hydroxyethylcellulose
[2] PEO: polyethylene oxide
[3] Manol accelerator, its amount is calculated on the basis of the purity. Its water is calculated as water in mortar.
[4] Total evaluation as an underwater concreting cement composition:
  ⊚: Excellent
  ○: Good
  △: Slightly unsuitable
  x: Unsuitable

COMPARATIVE EXAMPLES 4 to 6

Mortars were prepared in the same way as in Example 3 using various metal formates, and the properties were measured in the same way as in Example 1. Table 4 shows the mortar compositions and the results of the measurement. It can be recognized from the results of Table 4 that concerning mortars containing hydroxyethylcellulose, the effect of a metal formate on flow was such that a calcium salt improved applicability while magnesium, sodium and potassium salts lowered the flow.

COMPARATIVE EXAMPLES 7 TO 9

A mortar was prepared in the same way as in Example 3 by using methylhydroxyethylcellulose instead of hydroxyethylcellulose, and the properties were measured in the same way as in Example 1. Table 5 shows the mortar compositions and the results of the measurement.

Table 5 shows that concerning the cement compositions containing both methylhydroxyethylcellulose (MHEC) and a deformer, both calcium and magnesium formates lowered the flow.

EXAMPLES 4 TO 6 AND COMPARATIVE EXAMPLES 10 TO 11.

A setting time was measured according to the method of JIS R-5201 on a cement composition containing both hydroxyethylcellulose and polyethylene oxide and one prepared by adding thereto calcium formate. Table 6 shows the results.

TABLE 4

Additives and Mortar properties (water/cement = 0.65/1, sand/cement = 2/1)

| No. | Additives Substances | Manufacturer and Grade | Amount (% based on cement) | Turbidity of water (ppm) | Air quantity (%) | Penetration depth (mm) | Total evaluation |
|---|---|---|---|---|---|---|---|
| Example 3 | HEC | Daicel Kagaku Kogyo SP 900 | 0.45 | 5 | 6.3 | 91 | ○ |
| | PEC | Seitetsu Kagaku PEO-3 | 0.04 | | | | |
| | Accelerator | Reagent grade calcium formate | 2.00 | | | | |
| Comparative Example 4 | HEC | Daicel Kagaku Kogyo SP 900 | 0.45 | 5 | 6.3 | 73 | △ |
| | PEO | Seitetsu Kagaku PEO-3 | 0.04 | | | | |
| | Accelerator | Reagent grade magnesium formate | 2.00 | | | | |
| Comparative Example 5 | HEC | Daicel Kagaku Kogyo SP 900 | 0.45 | 6 | 6.2 | 55 | x |
| | PEO | Seitetsu Kagaku PEO-3 | 0.04 | | | | |
| | Accelerator | Reagent grade sodium formate | 2.00 | | | | |
| Comparative Example 6 | HEC | Daicel Kagaku Kogyo SP 900 | 0.45 | 6 | 6.2 | 55 | x |
| | PEO | Seitetsu Kagaku PEO-3 | 0.04 | | | | |
| | Accelerator | Reagent grade potassium formate | 2.00 | | | | |

TABLE 5

Additives and Mortar properties (water/cement = 0.65/1, sand/cement = 2/1)

| No. | Additives Substances | Manufacturer and Grade | Amount (% based on cement) | Turbidity of water (ppm) | Air quantity (%) | Penetration depth (mm) | Total evaluation |
|---|---|---|---|---|---|---|---|
| Comparative Example 7 | MHEC | Henkel Culminal MHEC 20000 PR | 0.45 | 72 | 5.7 | 85 | x |
| | Defoamer | San Nopco Defoamer 14-HP | 0.04 | | | | |
| Comparative Example 8 | MHEC | Henkel Culminal MHEC 20000 PR | 0.45 | 75 | 5.9 | 62 | x |
| | Defoamer | San Nopco Defoamer 14-HP | 0.04 | | | | |
| | Accelerator | Reagent grade calcium formate | 2.00 | | | | |
| Comparative Example 9 | MHEC | Henkel Culminal MHEC 20000 PR | 0.45 | 73 | 5.5 | 73 | x |
| | Defoamer | San Nopco Defoamer 14-HP | 0.04 | | | | |
| | Accelerator | Reagent grade magnesium formate | 2.00 | | | | |

TABLE 6

| No. | Accelerator | Cement/paste blend Cement (g) | Water (g) | SP 900 | PEO-3 | Accelerator (g) | Temperature (°C.) | Setting time Start (hr-min) | End (hr-min) |
|---|---|---|---|---|---|---|---|---|---|
| Comparative Example 10 | — | 400 | 107 | — | — | — | 21 | 2-30 | 3-35 |
| Comparative Example 11 | — | 400 | 112 | 2.2 | 0.3 | — | 21 | 8-00 | 11-00 |
| Example 4 | calcium formate | 400 | 116 | 2.2 | 0.3 | 4 | 21 | 5-45 | 8-03 |
| Example 5 | calcium formate | 400 | 117 | 2.2 | 0.3 | 8 | 21 | 3-20 | 5-25 |
| Example 6 | calcium formate | 400 | 120 | 2.2 | 0.3 | 16 | 21 | 1-50 | 3-05 |

EXAMPLE 7 AND COMPARATIVE EXAMPLES 12 TO 14

338 g of water was added to 520 g of portland cement to form a paste of a water/cement ratio of 0.65/1, which was then mixed with 2.11 g of hydroxyethylcellulose (SP 900, a product of Daicel Kagaku Kogyo Co., Ltd.), 0.23 g of a commercially available defoamer (SN-Defoamer 14-HP, a product of San Nopco Ltd.) and 10.4 of calcium formate to form a cement containing both the polymer and the accelerator. 1040 g of Toyoura standard sand was added to this polymer-containing cement to form a 1:2 mortar. This mortar had a penetration depth of 68 mm.

As comparative examples, a mortar having the same components except for the accelerator and containing no calcium formate (Comparative Example 12), one containing 10.4 g of sodium silicate as an accelerator (Comparative Example 13) and one containing 5.2 g of sodium aluminate as an accelerator (Comparative Example 14) were prepared and their penetration depth was measured with the results of 60 mm, 48 mm and 10 mm, respectively. These results clearly show that the flow obtained when calcium formate was used as an accelerator was excellent.

What is claimed is:

1. An underwater concreting cement composition comprising 100 parts by weight of hydraulic cement, mixed with (a) 0.2 to 2.0 parts by weight of hydroxyethylcellulose and (b) 0.01 to 0.2 part by weight of high-molecular weight polyethylene oxide and/or 0.2 to 4.0 parts by weight of calcium formate.

2. An underwater concreting cement composition as set forth in claim 1, wherein the hydroxyethylcellulose has from 1.5 to 4.0 moles of ethylene oxide substituent per anhydroglucose unit and a viscosity at 25° C. in a 1% aqueous solution of 1,000 to 7,000 cP.

3. An underwater concreting cement composition as set forth in claim 1, wherein the high-molecular weight polyethylene oxide has an average molecular weight of 60,000 to 6,000,000.

4. A cement composition comprising 100 parts by weight of hydraulic cement, mixed with (a) 0.2 to 2.0 parts by weight of hydroxyethylcellulose containing from 1.5 to 4.0 moles of ethylene oxide substituent per anhydroglucose unit and in which a 1% solution of said hydroxyethylcellulose has a viscosity of from 1,000 to 7,000 cP at 25° C. and (b) 0.01 to 0.2 part by weight of polyethylene oxide having an average molecular weight of from 100,000 to 2,500,000, the amount of (b) being about 1/10 the amount of (a).

5. A cement composition comprising 100 parts by weight of hydraulic cement, mixed with (a) 0.2 to 2.0 parts by weight of hydroxyethylcellulose containing from 1.5 to 4.0 moles of ethylene oxide substituent per anhydroglucose unit and in which a 1% solution of said hydroxyethylcellulose has a viscosity of from 1,000 to 7,000 cP at 25° C. and (b) 0.2 to 4.0 parts by weight of calcium formate.

6. A composition as claimed in claim 5, additionally containing (c) 0.01 to 0.2 part by weight of polyethylene oxide having an average molecular weight of from 100,000 to 2,500,000, the amount of (b) being about 1/10 the amount of (a).

* * * * *